(12) United States Patent
Beaudoin

(10) Patent No.: US 12,318,794 B2
(45) Date of Patent: Jun. 3, 2025

(54) FILM FOR MASKING AIRCRAFT COMPONENTS AND METHOD OF POSITIONING SAME

(71) Applicant: ADHETEC CANADA INC., Drummondville (CA)

(72) Inventor: Diane Beaudoin, Drummondville (CA)

(73) Assignee: ADHETEC CANADA INC., Drummondville (CA)

( * ) Notice: Subject to any disclaimer, the term of this patent is extended or adjusted under 35 U.S.C. 154(b) by 0 days.

(21) Appl. No.: 18/300,853

(22) Filed: Apr. 14, 2023

(65) Prior Publication Data

US 2023/0249209 A1    Aug. 10, 2023

Related U.S. Application Data

(63) Continuation of application No. 16/486,361, filed as application No. PCT/CA2018/050175 on Feb. 16, 2018, now Pat. No. 11,684,940.

(Continued)

(51) Int. Cl.
  *B05B 12/24*    (2018.01)
  *B05B 12/00*    (2018.01)
  (Continued)

(52) U.S. Cl.
  CPC .......... *B05B 12/24* (2018.02); *B05B 12/0024* (2018.08); *B05C 21/005* (2013.01);
  (Continued)

(58) Field of Classification Search
  None
  See application file for complete search history.

(56) References Cited

U.S. PATENT DOCUMENTS 4,681,785 A    7/1987 Horn
5,052,641 A    10/1991 Coleman
(Continued)

FOREIGN PATENT DOCUMENTS

DE    3308282 A1    9/1984
EP    0782912 A1    7/1997
(Continued)

OTHER PUBLICATIONS

Car coreless multi-folded overspray car cover, Alibaba.com, retrieved on Jun. 28, 2018 from website: https://www.alibaba.com/product-detail/Car-coreless-multi-folded--overspray-car_60550916585.html?spm=a2700.7724857.main07.81.2d08308d3fuGis, 6 pages.

(Continued)

*Primary Examiner* — Jethro M. Pence
(74) *Attorney, Agent, or Firm* — Dority & Manning, P.A.

(57) ABSTRACT

A packaged film for masking an aircraft component, wherein the packaged film is configured to form a tubular sleeve when unpackaged. The packaged film is formed by performing a longitudinal telescopic folding operation on a longitudinal portion of a film to provide a longitudinally parallelogram-shaped stacked film; and performing at least a first transverse folding operation on a first portion of the longitudinally parallelogram-shaped stacked film, the first transverse folding operation comprising an operation selected from accordion folding and roll folding to provide the packaged film. The packaged film is capable of being unfolded in a reverse order of the longitudinal telescopic folding operation and the first transverse folding operation to cover said aircraft component.

12 Claims, 12 Drawing Sheets

Related U.S. Application Data

(60) Provisional application No. 62/460,182, filed on Feb. 17, 2017.

(51) Int. Cl.
    *B05C 21/00*     (2006.01)
    *B64F 5/10*     (2017.01)
    *B65B 11/00*     (2006.01)
    *B65B 25/14*     (2006.01)
    *B65B 63/04*     (2006.01)
    *B65B 65/04*     (2006.01)
    *B65D 77/02*     (2006.01)
    *B65H 45/04*     (2006.01)
    *B65H 75/10*     (2006.01)

(52) U.S. Cl.
    CPC .............. *B64F 5/10* (2017.01); *B65B 11/00* (2013.01); *B65B 25/14* (2013.01); *B65B 25/145* (2013.01); *B65B 25/146* (2013.01); *B65B 63/04* (2013.01); *B65D 77/02* (2013.01); *B65H 45/04* (2013.01); *B65H 75/10* (2013.01)

(56) References Cited

U.S. PATENT DOCUMENTS

| | | | |
|---|---|---|---|
| 5,096,761 | A | 3/1992 | Roberts et al. |
| 5,306,347 | A | 4/1994 | Semle et al. |
| 5,741,389 | A | 4/1998 | Yoshino |
| 6,124,018 | A * | 9/2000 | Yoshino .......... B05B 12/24 428/192 |
| 6,629,800 | B1 | 10/2003 | Brown |
| 6,887,553 | B1 | 5/2005 | Heil et al. |
| 7,022,188 | B2 | 4/2006 | Ganci |
| 8,535,778 | B2 | 9/2013 | Lee |
| 9,623,438 | B2 | 4/2017 | Moore |
| 2004/0166298 | A1 | 8/2004 | Chapman et al. |
| 2004/0187432 | A1 | 9/2004 | Robison et al. |
| 2005/0249908 | A1 | 10/2005 | Duncan et al. |
| 2011/0177250 | A1 | 7/2011 | Jakimov et al. |
| 2013/0160707 | A1 | 6/2013 | Moore |
| 2015/0079287 | A1 * | 3/2015 | VanDenBerghe ........ B05D 1/32 427/282 |
| 2015/0283571 | A1 | 10/2015 | Sais |

FOREIGN PATENT DOCUMENTS

| | | |
|---|---|---|
| EP | 0785869 B1 | 8/1999 |
| FR | 2617124 | 12/1988 |
| GB | 2347914 A | 9/2000 |
| JP | H078857 | 1/1995 |
| JP | H08108474 A | 4/1996 |
| JP | H10165862 | 6/1998 |
| WO | WO2005068294 | 7/2005 |

OTHER PUBLICATIONS

Final Office Action for corresponding U.S. Appl. No. 16/486,361, mailed Apr. 5, 2022, 12 pages.
Non-Final Office Action for corresponding U.S. Appl. No. 16/486,361, mailed Sep. 3, 2021, 37 pages.
Non-Final Office Action for corresponding U.S. Appl. No. 16/486,361, mailed Aug. 15, 2022, 17 pages.
Notice of Allowance for corresponding U.S. Appl. No. 16/486,361, mailed Feb. 8, 2023, 10 pages.
PCT International Search Report (w/ English translation) and Written Opinion for corresponding PCT Application No. PCT/CA2018/050175, Apr. 3, 2018, 9 pages.
Search Report for corresponding Chinese Application No. 2018800121163, 2 pages.

* cited by examiner

FILM FOR MASKING AIRCRAFT COMPONENTS AND METHOD OF POSITIONING SAME

REFERENCE AND PRIORITY CLAIM

The present application is a divisional of U.S. application Ser. No. 16/486,361, filed on Aug. 15, 2019, which is a 371 of International Application No. PCT/CA2018/050175, filed on Feb. 16, 2018, which claims priority to U.S. provisional application 62/460,182, filed on Feb. 17, 2017, the description of which is incorporated herein by reference.

TECHNICAL FIELD

The technical field of the invention relates to packaged films and methods for unfolding these films in order to mask aircraft components, parts or sections during painting and finishing operations. The masking films are made to measure for different types of aircraft.

PRIOR ART

In general, in the field of large parts to be protected such as aircraft components (i.e. aircraft parts or sections), masking is carried out conventionally using a mask made from rolls of brown paper or flexible plastic or soft structure Tyvek®, installed and/or unrolled around the component to be protected and secured using adhesive tape. The adhesive tape is used both to secure the mask to the surface of the aircraft component and to join the portions of the mask together. This method has drawbacks with regard to (1) the time and resources required to envelop and/or mask the aircraft components and/or unroll the rolls of masking material and join the edges together, (2) the risk of damaging the aircraft surfaces when cutting the mask in order to fit the dimension of the masking material to the section of the aircraft component to be covered, and (3) the damage that might be caused to the surface of the aircraft on removal of the mask, which might require dismantling by cutting it off using knives or tools with sharp blades.

In light of the above, there is therefore a need for a film for masking an aircraft component and a method for unfolding this film that is capable of overcoming or at least minimizing at least one drawback of the prior art.

SUMMARY

According to a general aspect, the invention relates to a film for masking an aircraft component, the film having a longitudinal portion and a transverse portion and being configured to cover the aircraft component, the film being packaged by an operation selected from the following operations: accordion folding, telescopic folding, gate folding, roll folding, winding around a core and winding the film on itself, on the longitudinal portion; or an operation selected from the following operations: accordion folding, telescopic folding, gate folding, roll folding, winding around a core and winding the film on itself, on the transverse portion.

In one embodiment, the film has an inner face and an outer face, the film comprising positioning marks on one face of the film, the positioning marks being positioned according to geometric features of the aircraft component.

In one embodiment, the positioning marks include a tape selected from the following: a colored tape, a printed tape, a translucent tape, the tape optionally comprising perforated dots forming a tear line suitable for forming detachable segments of film.

In one embodiment, the aircraft component is an aircraft nose, the film being packaged by an accordion folding operation on the longitudinal portion of the film and an accordion folding operation on the transverse portion of the film, followed by a gate folding operation on the transverse portion of the film.

In one embodiment, the aircraft component is an aircraft fuselage, the film being packaged by an accordion folding operation on the longitudinal portion of the film followed by a folding operation selected from accordion folding and roll folding on the transverse portion of the film, followed by a gate folding operation on the transverse portion of the film.

In one embodiment, the aircraft component is an aircraft wing, the film being configured to form a substantially tubular sleeve and being packaged by a telescopic folding operation on the longitudinal portion of the film forming a parallelogram.

In one embodiment, the film is also packaged by an operation selected from accordion folding and roll folding in a direction substantially parallel to the base of the parallelogram.

In one embodiment, the base of the parallelogram extends substantially perpendicular to the longitudinal portion of the film.

In one embodiment, the sleeve has an open end and a closed end longitudinally opposite the open end.

In one embodiment, the film is packaged in the direction parallel to the base of the parallelogram by an operation selected from accordion folding and roll folding in order to form a first stacked section, followed by an accordion folding operation in the direction parallel to the base of the parallelogram in order to form a second stacked section, and by a gate folding operation of the stacked sections in the direction parallel to the base of the parallelogram.

In one embodiment, the film is packaged by a single folding operation of the closed end of the sleeve in a direction substantially perpendicular to the base of the parallelogram.

In one embodiment, the aircraft component is an aircraft wing, the film being packaged by an operation selected from accordion folding and gate folding on the transverse portion of the film, followed by an operation of winding around a core on the longitudinal portion of the film.

In one embodiment, the film has an anti-static property.

In one embodiment, the film is permeable to air and solvent vapor.

In one embodiment, the film is impermeable to paint, water and solvents.

In one embodiment, the film has properties enabling coatings to adhere to the film.

According to another general aspect, the invention relates to a method for unfolding a film for masking an aircraft component, comprising the following steps: supplying a film having dimensions that match the dimensions of the aircraft component; positioning the film on a upper part of the aircraft component and orienting it in an initial position on the upper part relative to geometric features of the aircraft component; after step b), performing one of the following actions: unfolding the film from the initial position on the upper part in a transverse direction of the aircraft component, and unfolding the film from the initial position on the upper part in a longitudinal direction of the aircraft component; if in step c) the film is unfolded from the initial position on the upper part in the transverse direction of the aircraft component: unfolding the film from the initial position on the upper part in the longitudinal direction of the aircraft component; and if in step c) the film is unfolded from the initial position on the upper part in the longitudinal direction of the aircraft component: unfolding the film from the initial position on the upper part in the transverse direction of the aircraft component.

In one embodiment, the method in which in step a) the film comprises positioning marks, the method comprises after step d) or e), a step for positioning the film on the aircraft component using the positioning marks according to geometric features of the aircraft component.

In one embodiment, the method for which, in step a), the film is wound around a core, and, in step b), a section of the film is slipped onto one end of the upper part, the method also comprises one of the following unfolding steps: unrolling the film from the end of the upper part in a longitudinal direction of the aircraft component, and unfolding the film on the upper part in a transverse direction of the aircraft component.

In one embodiment, the method comprises, in step a), supplying a guide element packaged with the film for the subsequent unfolding of the film on the aircraft component, the method comprising, in step b), aligning the guide element with the aircraft component.

In one embodiment, the aircraft component is an aircraft wing, the method comprising, in step a), supplying a film configured to form a sleeve and a guide element packaged with the film for the subsequent unfolding of the film on the wing, the method comprising, in step b), aligning the guide element with the aileron of the wing.

In one embodiment, the invention relates to a kit for masking an aircraft component, the kit comprising a film for masking the aircraft component and a guide element packaged juxtaposed with the film for the subsequent unfolding of the film on the aircraft component.

In one embodiment, the guide element is rigid.

In one embodiment, the kit comprises instructions for the unfolding of the film.

In one embodiment, the invention relates to a method for masking an aircraft component using the kit.

BRIEF DESCRIPTION OF THE FIGS.

FIG. 6A is a perspective view of the flattened (i.e. two-dimensional) film.

FIG. 6B is a perspective view showing the position of the folds of the telescopic folding of the film.

FIG. 6C is a perspective view of the nesting of sections of the film by means of the telescopic folds from the end T7 of the film.

FIG. 6D is a perspective view of the film once all of the telescopic folds have been nested, together with the insertion of a guide element.

FIG. 6E is a top view of the parallelogram formed by the film once it has been flattened (i.e. two-dimensional), together with the position of the guide element.

DETAILED DESCRIPTION

Definitions

The term "approximately" as used in the present patent application refers to a margin of error of + or −15% of the associated number. For reasons of accuracy, the word "approximately", when used in conjunction with, for example, 100%, means 100%±15%, i.e. from 85% to 115%.

The term "aircraft" is used to denote airplanes (airliners, light aircraft, etc.), helicopters or any other type of aircraft requiring finishing steps.

The expression "aircraft components" is used to denote aircraft parts, portions and sections, such as a nose, a nose cone, a wing, a stabilizer, a vertical stabilizer, a nacelle, etc.

The expression "mask" is used to describe the film that envelops, wraps, protects and covers all or part of an aircraft component.

The term "fit" is used to describe the film that is sized, cut and configured to cover as a function of the dimensions of the component to be masked.

The term "packaged" is used to describe an action of folding, rolling, stacking, packing the film so as to enable the transportation and storage thereof, once packed, and to facilitate the unfolding of this film on the aircraft component with minimum requirement for personnel, steps and tools. This packaging, which is specific to each aircraft component and aircraft type, required in-depth investigation and several years of experience in order to optimize the operation and unfolding of the packaged film.

The term "telescopic" is used to describe the folding of a generally tubular element that comprises sealed sides. When three sides are sealed, one end of the element is open and one end is closed. The element thus forms a tube, a cone, a finger, a sheath, a sleeve, a hat, a cap, or any other substantially tubular element closed at one end and open at the longitudinally opposite end. One or more transverse sections of the tubular element are then folded so that each subsequent section is inserted into another section or vice versa, such as a person skilled in the art might envisage for an antenna or a telescope (see FIGS. 6B to 6D).

DETAILED DESCRIPTION

With reference to the figures, a film for masking an aircraft component and a method for unfolding this film on an aircraft component will be described. A kit comprising a film and a guide element, together with an unfolding method comprising the use of the kit, are described. The film, the kit, and the unfolding method are adjusted to the dimensions and geometric features of the aircraft or aircraft portions to be masked.

Figure 1A:
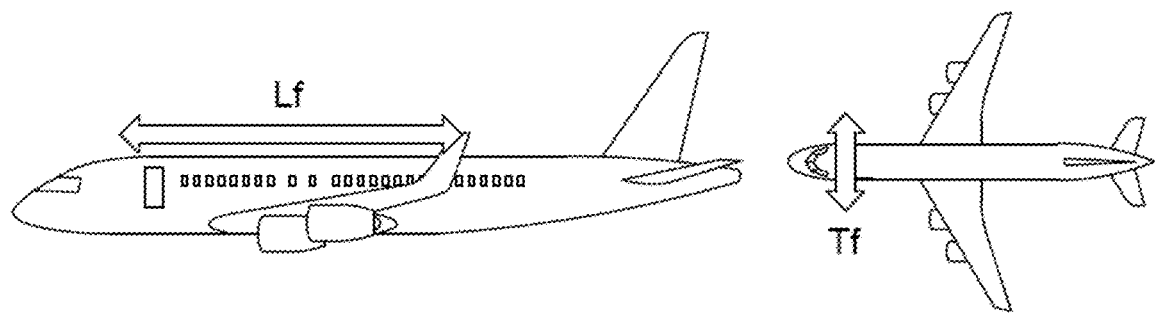
FIG. 1A shows a side view and a top view of an aircraft, the longitudinal and transverse directions of the aircraft fuselage being indicated by the arrows $L_f$ and $T_f$ respectively.
Figure 1B:
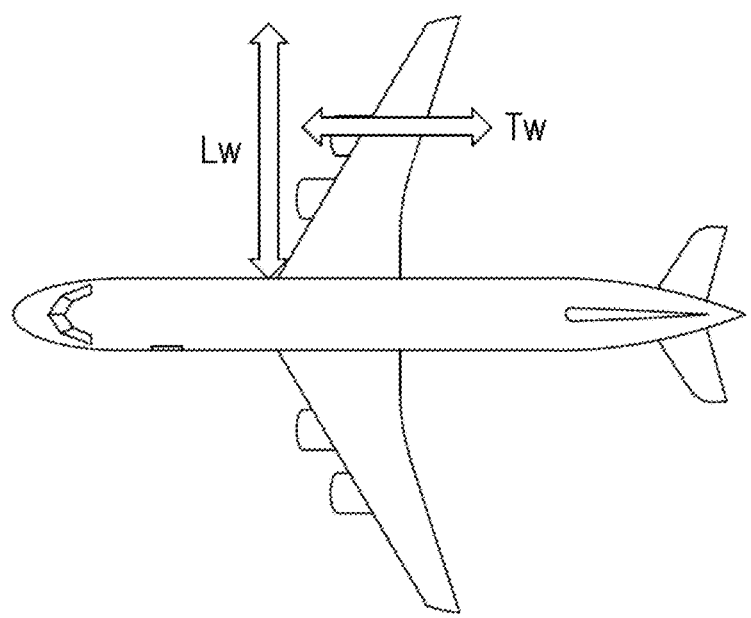
FIG. 1B is a top view of an aircraft, the longitudinal and transverse directions of the aircraft wing being indicated by the arrows $L_w$ and $T_w$ respectively.
Figure 1C:
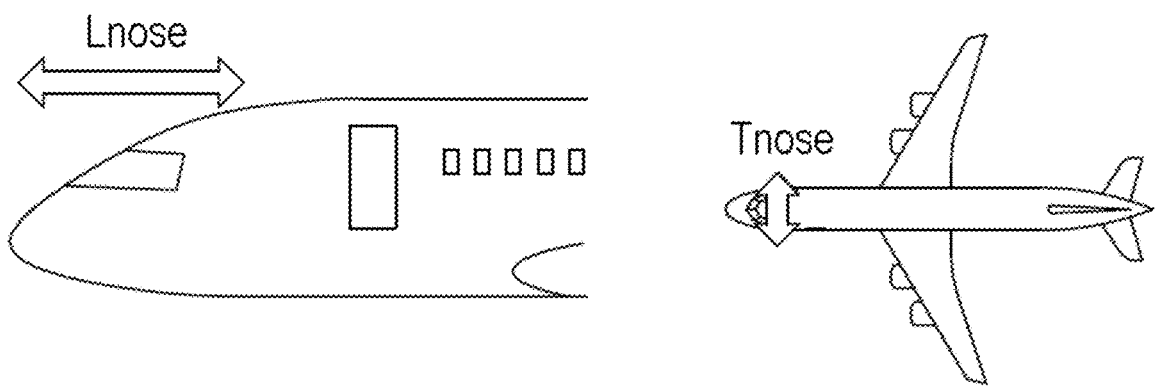
FIG. 1C shows a side view and a top view of an aircraft, the longitudinal and transverse directions of the aircraft nose being indicated by the arrows $L_{nose}$ and $T_{nose}$ respectively.
Figure 1D:
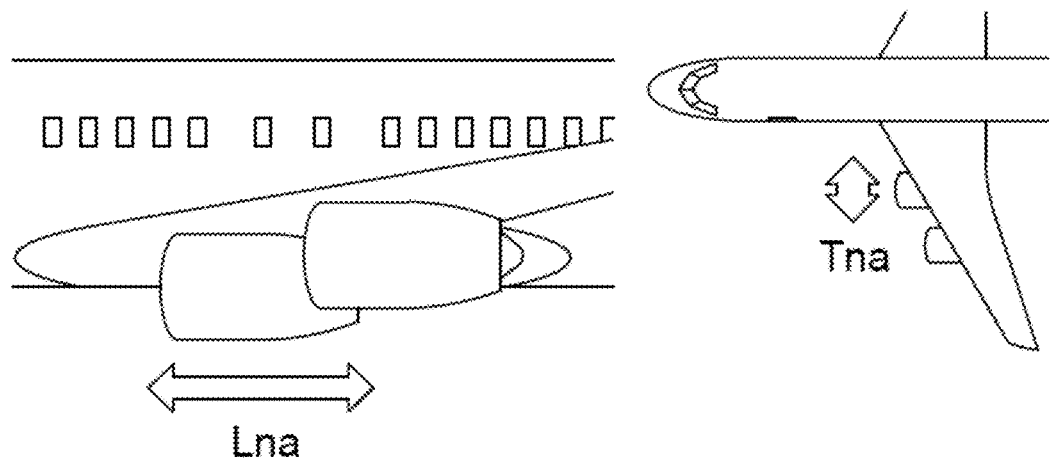
FIG. 1D shows a side view and a top view of an aircraft, the longitudinal and transverse directions of the aircraft nacelle being indicated by the arrows $L_{na}$ and $T_{na}$ respectively.
Figure 1E:
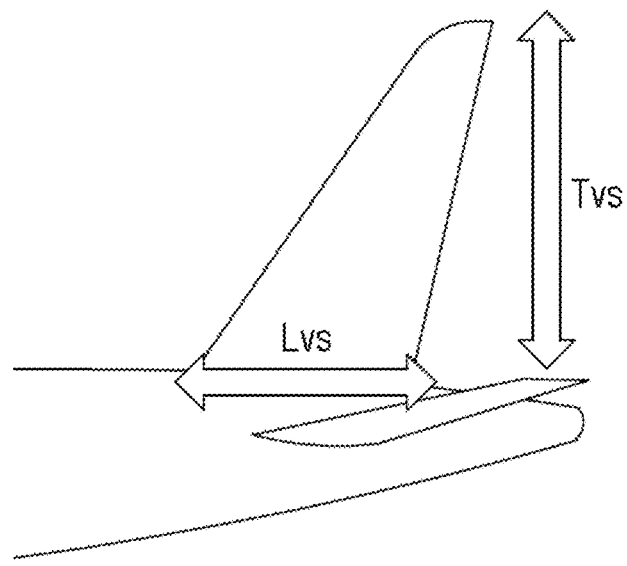
FIG. 1E is a side view of an aircraft vertical stabilizer, the longitudinal and transverse directions of which are indicated by the arrows $L_{vs}$ and $T_{vs}$ respectively.
Figure 1F:
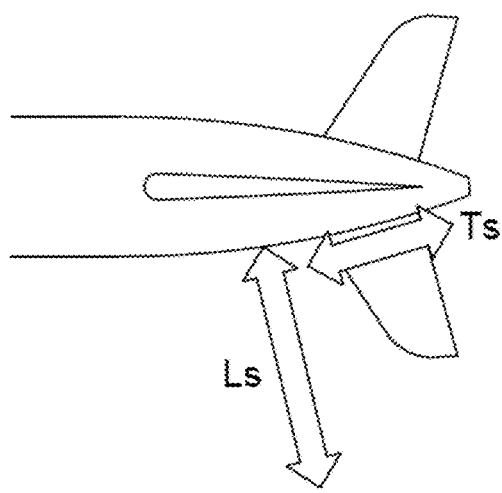
FIG. 1F is a top view of an aircraft stabilizer, the longitudinal and transverse directions of which are indicated by the arrows $L_s$ and $T_s$ respectively.

More particularly, with reference to FIGS. 1A to 1F, each aircraft component has dimensions that can be measured in longitudinal and transverse directions. Arrows L and T indicate the longitudinal and transverse directions for each component. More specifically, in FIG. 1A, the arrows $L_f$ and $T_f$ respectively denote the longitudinal and transverse directions of an aircraft fuselage. In FIG. 1B, the arrows $L_w$ and $T_w$ respectively denote the longitudinal and transverse directions of an aircraft wing. In FIG. 10, the arrows $L_{nose}$ and $T_{nose}$ respectively denote the longitudinal and transverse directions of an aircraft nose cone. In FIG. 1D, the arrows $L_{na}$ and $T_{na}$ respectively denote the longitudinal and transverse directions of a nacelle. In FIG. 1 E, the arrows $L_{vs}$ and $T_{vs}$ respectively denote the longitudinal and transverse directions of an aircraft vertical stabilizer. In FIG. 1F, the arrows $L_s$ and $T_s$ respectively denote the longitudinal and transverse directions of an aircraft stabilizer. The unpackaged, i.e. not folded, film comprises a longitudinal portion having a dimension that corresponds to, i.e. matches, the dimension of the aircraft component in the longitudinal direction, and a transverse portion having a dimension that corresponds to the dimension of the aircraft component in the transverse direction. It will be appreciated that the dimensions of the film can be substantially equal to the dimensions of the component, or that they can be substantially greater than the dimensions of the component. It will also be appreciated that the film can cover the component partially or fully and that one or more films can be used to cover an aircraft component. It will also be appreciated that one film can cover several aircraft components. The film designed is a substantially two-dimensional object when it is flattened, and is configured to cover the component, which is a three-dimensional object.

In the field of finishing aircraft components and the masking required for this finishing, the difficulty lies in the unfolding and securing, by a single person or a small team, of the film in order to cover and protect the components, which are generally on a large scale (i.e. more than approximately 4 meters long), or on a very large scale (i.e. more than 20 meters long). The different embodiments of the film and unfolding method described below thus provide a solution to this problem by supplying a masking film packaged so that it can be packed, transported, installed, and unfolded easily and intuitively on the aircraft components by very few personnel. In addition, the films are packaged to avoid having to use sharp instruments to install them or remove them, thus reducing the risk of breakage or scratches spoiling the finish of the components.

The contribution of the invention lies in particular in the packaging of a film the shapes and dimensions of which match those of an aircraft component, designed to be unfolded in three dimensions to cover aircraft components. The packaging consists of performing several folding operations, details of which are given below. In short, the film is shaped, i.e. cut out from a masking material, and then packaged. The packaging can also include the packing of the packaged film in a bag or box for storage and/or transportation.

The film is made from a masking material having in particular mechanical and chemical properties enabling the masking of aircraft components and the finishing of these components. It will thus be appreciated that, in one embodiment, the film is permeable to air and solvent vapors. In one embodiment, the film is also impermeable to paint, water and solvents. In addition, it will be appreciated that the film can comprise properties enabling coatings to adhere to the film without flaking, it being possible for the coatings to be paint or lacquer. In one embodiment, the film has anti-static properties.

Figure 2A:
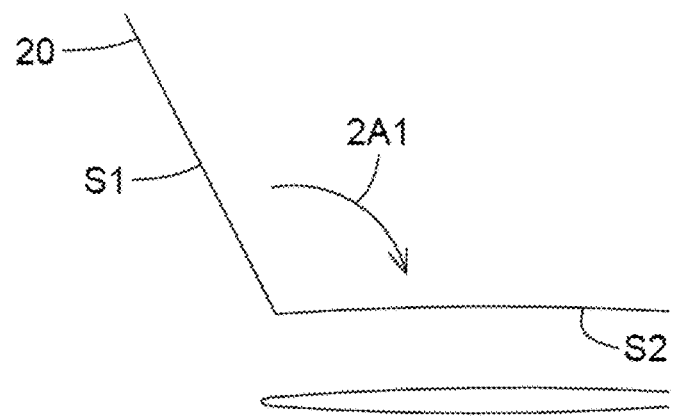
FIG. 2A is a side view of an example of film for masking an aircraft component, showing a step of single gate folding and the fold obtained.
Figure 2B:
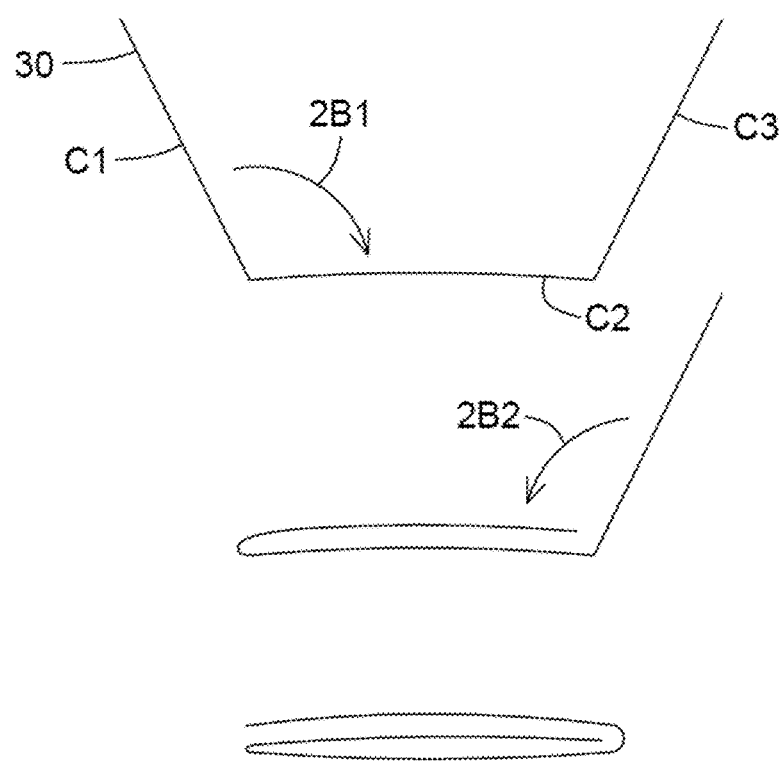
FIG. 2B is a side view of an example of film for masking an aircraft component, showing a sequence of steps of double gate folding and the folds obtained.

With reference to FIG. 2A, a type of single gate folding is shown. The film 20 comprises a section S1 and a section S2. The section S1 is folded onto the section S2 in a folding operation 2A1. This type of fold can also be denoted by the expression "single fold". With reference to FIG. 2B, a type of double gate folding is shown. The film 30 comprises a section C1, a section C2 and a section C3. Section C1 is folded onto section C2 in a folding step 2131, then section C3 is folded onto section C1 in a folding step 2B2.

Figure 3A:
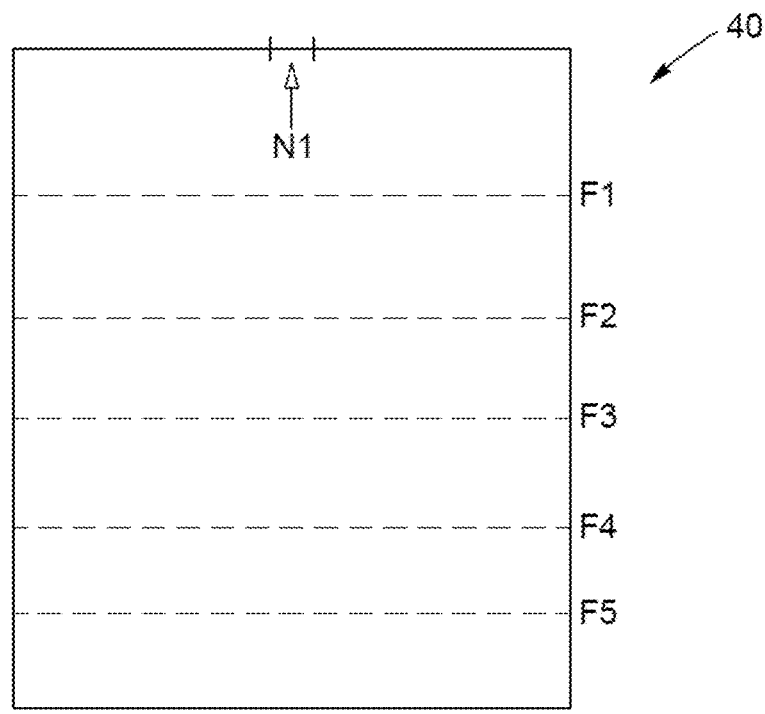
FIG. 3A is a top view of a film for masking an aircraft fuselage according to one embodiment, showing the positioning of the folds for packaging the film by a type of accordion folding on the longitudinal portion.

With reference to FIGS. 3A to 4B, an embodiment of a film for masking an aircraft fuselage is shown. In the embodiment shown, the film is rectangular. It will be appreciated that the fuselage will have different dimensions depending on the type of aircraft, and therefore the film can be of rectangular or another shape. It will also be appreciated that a film having a single layer can be used, and that a film having several layers can also be used to mask an aircraft component such as a fuselage. In the embodiment shown and as described below, the folds define sections of film folded onto each other depending on the type of folding. The shape and size of the sections are therefore determined by the position of the folds. The type of packaging of the film in the embodiment shown in FIG. 3A is accordion folding, to facilitate the unfolding of the film on the fuselage, it being possible for one or two people to unfold the film. The packaging of the embodiment of this film takes place in three steps. First, the longitudinal portion of this film 40 is accordion folded along the folds F1 to F5 so as to form therefrom a smaller stacked film (see FIG. 3B) compared to the initial longitudinal dimension of the film. Then, the transverse portion of the film 40 is packaged as described below.

Figure 3B:
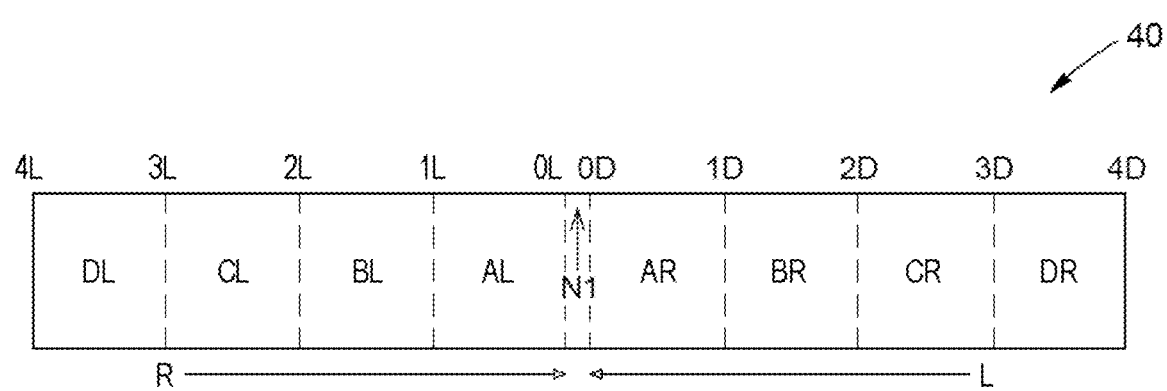
FIG. 3B is a top view of the film shown in FIG. 3A, once folded on the longitudinal portion, showing the positioning of the accordion folds on the transverse portion for packaging the film.

FIG. 3B shows the film in FIG. 3A once it has been folded longitudinally. For the transverse folding operation, the sections and folds of the left-hand portion of the film 40 are denoted by an "L", while the sections and folds of the right-hand portion of the film are denoted by an "R". The order of the folds is denoted by a digit: 1L, 2L, 3L, and so on. The left-hand sections are identified by DL, CL, BL, and AL and the right-hand sections are identified by DR, CR, BR, and AR, while the folds are denoted by 1L, 2L, 3L, and 4L for the left-hand section of the top view, and by 1R, 2R, 3R, and 4R for the right-hand section of the top view. It will be appreciated that the number of folding sections, and therefore folds, can vary.

Figure 3C:
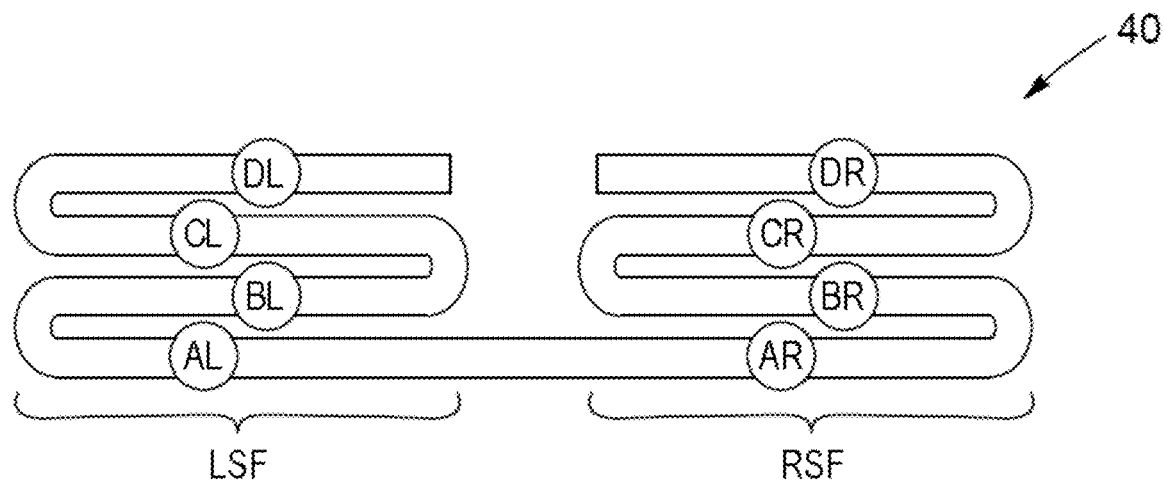
FIG. 3C is a side view of the film shown in FIG. 3B showing the type of accordion folding.
Figure 3D:
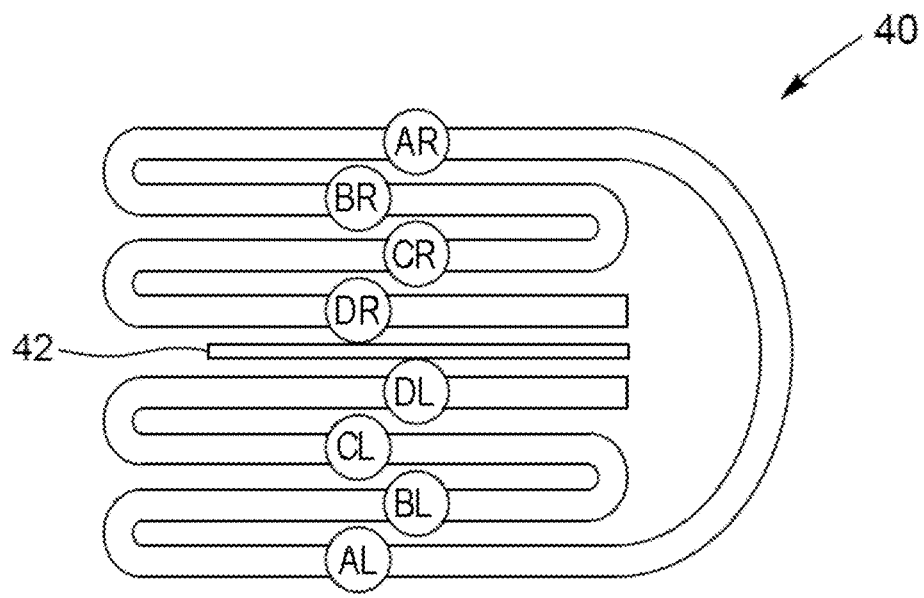
FIG. 3D is a side view of the exemplary embodiment of the film in FIG. 3C showing subsequent single gate folding with insertion of a guide element.

With reference to FIGS. 3B and 3C, a first step for accordion folding consists, for the right-hand section of the film 40, of folding section BR onto section AR in direction L using fold 1R, folding section CR onto sections BR and AR that have already been stacked using fold 2R in direction L, and folding section DR using fold 3R in direction L, onto the stacked sections CR, BR, and AR. For the left-hand section of the film 40, the accordion folding sequence consists of folding section BL onto section AL in direction R using fold 1L, and folding section CL in direction R using fold 2L onto sections BL and AL, and finally folding section DL in direction R using fold 3L onto the stacked sections CL, BL, and AL. The folds in directions L and R can be made simultaneously by two people, which reduces the packaging time of the film 40. The result of the folding operations of sections DL, CL, BL, and AL and sections DR, CR, BR, and AR as shown in the top view in FIG. 3B is shown in FIG. 3C, as a left sub-fold LSF and a right sub-fold RSF. For the embodiment of the film 40 partially packaged as shown in FIG. 3C, the two sub-fold sections LSF and RSF lie side by side, ready for the last single folding operation to form a packaged film (FIG. 3D) ready for packing, unpacking and unfolding on the aircraft component. The last single fold consists of folding the right sub-fold RSF onto the left sub-fold LSF along the folds 0R and 0L (FIG. 3B) in order to obtain the packaged film 40 shown in FIG. 3D. It will be appreciated that the last single fold can also be made by folding the left sub-fold LSF onto the right sub-fold RSF along the folds 0R and 0L. In the embodiment shown, the film 40 comprises positioning marks N1 to guide the position of the film 40 in accordance with the geometry of the fuselage, the marks N1 indicating the orientation of the nose of the aircraft (FIGS. 3A and 3B). In the embodiment shown in FIG. 3D, the insertion of a rigid guide element 42 when the last fold is made, between the sub-folds LSF and RSF, makes it possible to guide the positioning of the film 40 when it is unfolded on the aircraft component.

As a result, the film packaged according to the packaging steps described above is unfolded easily and intuitively, often by a single person. The completely packaged film (FIG. 3D) is placed on an upper part of the fuselage and unpacked (i.e. removed from its transportation packing). The sub-fold on top (LSF or RSF) of the other sub-fold is opened out, resulting in the configuration of the film shown in FIG. 3C. The two sections LSF and RSF are then extended so that their respective ends (sections DL and DR) fall 30 by gravity, and hang down on each side of the fuselage according to the configuration in FIG. 3B, in which all of the transverse sections (AL to DL and AR to DR) of the film are unfolded. The film 40 therefore extends in the transverse direction $T_f$ of the fuselage (FIG. 1A).

The front portion, i.e. the "nose" denoted by the arrow and the letter N1 in FIGS. 3A and 3B, of the partially unfolded film according to FIG. 3B is then partially secured to the fuselage by means of adhesive tape, or any other temporary securing means, and the rear portion of the film is then extended by a person facing the rear of the aircraft in the longitudinal direction $L_f$ of the fuselage (FIG. 1A). The film is unfolded in order to return to its initial appearance shown in FIG. 3A. The film completely unfolded in this way is wrapped around the fuselage and secured thereto for the finishing operations.

Figure 4A:
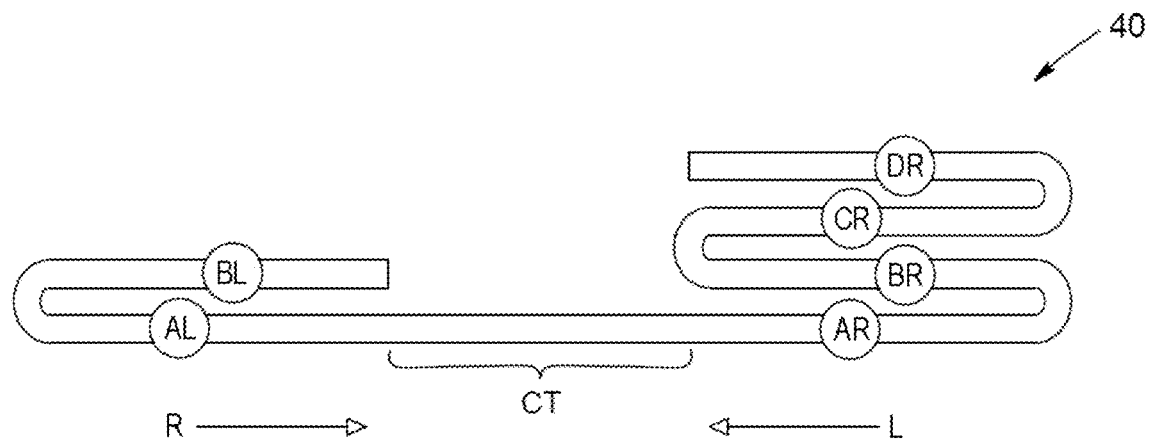
FIG. 4A is a side view of a film for masking an aircraft component according to one embodiment, showing the type of accordion folding.
Figure 4B:
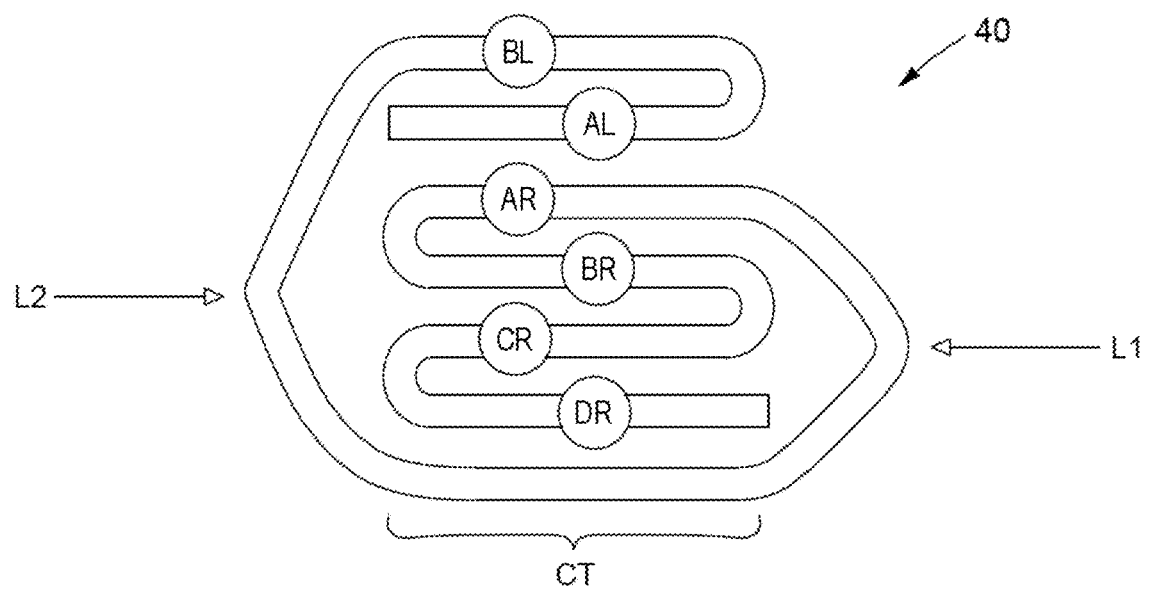
FIG. 4B is a side view of the film shown in FIG. 4A, the accordion folding being followed by double gate folding.

With reference to FIGS. 4A and 4B, in the case of films for masking large aircraft components, there are often multiple folds in order to reduce the volume of the packet, i.e. the packaged and packed film, in order to facilitate the transportation thereof.

According to the embodiment shown, the packaging of the film 40 by accordion and gate folding first requires three sections of film: a left-hand section comprising sections AL and BL, a central section CT, and a right-hand section comprising sections AR to DR. First of all, the accordion folding is carried out by folding section BL onto section AL, in direction R (single fold). Sections DR, CR, BR and AR are accordion folded, i.e. section BR is folded onto section AR, section CR is folded onto section BR and section DR is folded onto section CR. It will be appreciated that the number of folds and the number of sections of film varies depending on the size of the component.

With reference to FIG. 4B, the double gate folding is carried out next by folding the right-hand section (comprising sections AR to DR) in direction L (FIG. 4A) along fold L1 onto the central section CT, and folding the left-hand section (comprising sections AL and BL) in direction R (FIG. 4A) along fold L2 onto the right-hand section as shown, or vice versa, by folding the left-hand section in direction R onto the central section CT, and folding the right-hand section in direction L onto the left-hand section. This embodiment relates to packaging the film 40 for masking an aircraft fuselage, but it will be appreciated that a film for masking other aircraft components such as a horizontal stabilizer, vertical stabilizer, or wing, can be packaged according to these types of folding and the folding sequence described above.

Figure 5:
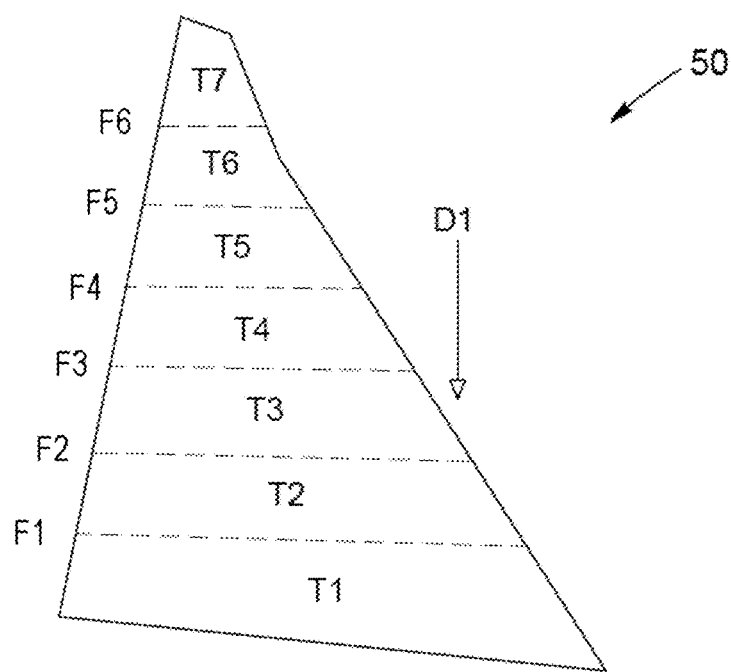
FIG. 5 is a top view of a sleeve-type film for masking an aircraft wing according to one embodiment, flattened (i.e. two-dimensional), showing the positioning of the folds for a type of telescopic folding in which the order of folding of the folds is shown by the arrow in the direction D1.

With reference to FIGS. 5 to 8B, an embodiment of a film for masking an aircraft wing is shown. In the embodiment shown, the film has a substantially similar initial shape to the shape of the aircraft wing to be masked. It will be appreciated that the wings will have different dimensions and a different shape depending on the type of aircraft, and the film will therefore have a different initial shape from the shape of the film shown in FIG. 5. The film 50 shown in FIG. 5 has a substantially conical shape to envelop a portion of the aircraft wing and its aileron (i.e. at the outer end of the wing). FIG. 5 is a top view of the conical film, flattened, i.e. two-dimensional, thus comprising two layers of film, i.e. a layer of film used to cover the top of the wing, and a layer of film used to cover the bottom of the wing. The film comprises three sealed ends, thus forming a conical tube, thus covering, when unfolded on the wing, the side of the wing running along the leading edge, the side of the wing running along the aileron, and the side running along the wing tip. It will be appreciated that in an alternative embodiment, the film comprises one sealed end, for example the end running along the leading edge of the wing. In another alternative embodiment, the film comprises two sealed ends thus forming a tube open at the longitudinally opposite ends, i.e. open ends corresponding to the wing root and the wing tip. In the embodiment shown in FIGS. 6A to 6E, the film is packaged by telescopic folding. The folds are denoted in FIG. 5 by F1, F2, F3, F4, F5, and F6, and make it possible to package the film along the longitudinal portion thereof. The sections are identified as T1, T2, T3, T4, T5, T6, and T7.

The sequence of telescopic folding steps on the basis of the film 50 in FIG. 5 is shown in FIGS. 6A to 6E. The first step consists of folding section T7 (FIG. 5), which corresponds to the aileron, partially inside section T6 in direction D1 using fold F6. Then, sections T6 and T7 are folded into section T5 (fold F5), sections T5, T6, and T7 into section T4 (fold F4), and so on until all of the sections T1, T2, T3, T4, T5, T6, and T7 (partially) overlap (FIG. 6E) and form a stack of sections forming a parallelogram, section T7, i.e. the end of the sleeve, extending slightly outside the perimeter of the parallelogram. As mentioned above, the longitudinal portion of the film is packaged by telescopic folding. In the embodiment shown, the parallelogram, i.e. the stack of sections, comprises a base that extends substantially perpendicular to the initial longitudinal dimension of the film as shown in its flattened position in FIG. 5.

Figures 6A, 6B, 6C:
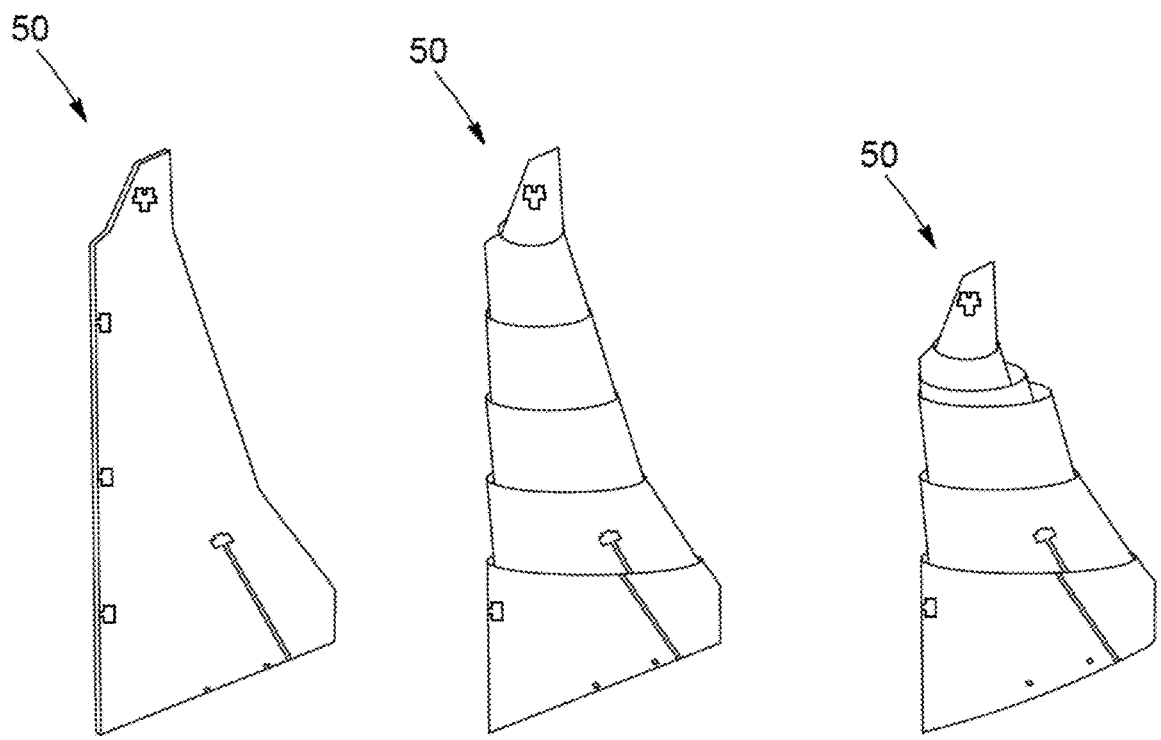
FIGS. 6A to 6E show the sequence of telescopic folding of the film in FIG. 5.

In an alternative embodiment (not shown) to the one shown in FIGS. 6A to 6C, the telescopic folding is carried out in an opposite folding direction to direction D1, and thus section T1 is folded onto section T2 using fold F1, sections T1 and T2 are then folded onto section T3 using fold F2, and so on.

Figure 6D:
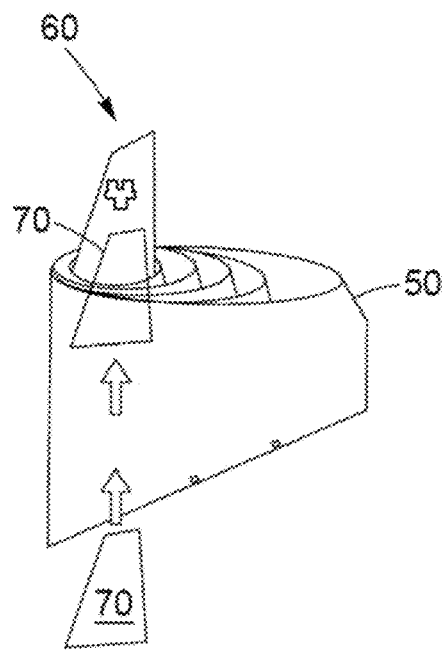
Figure 6E:
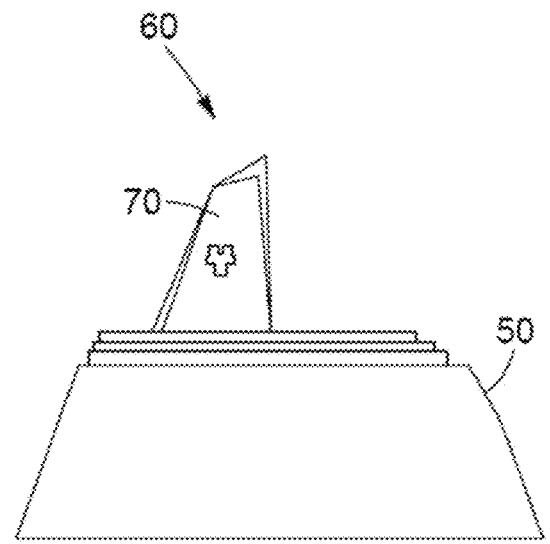
Figure 7:
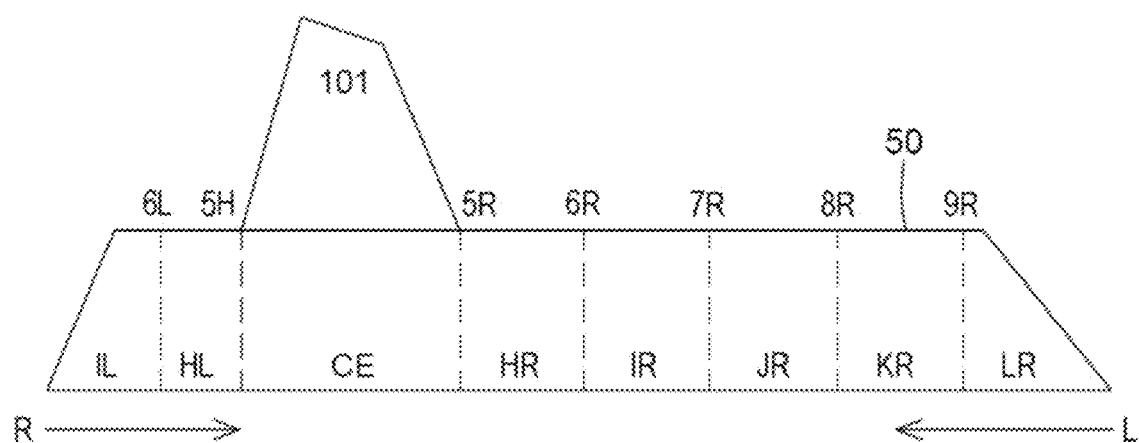
FIG. 7 is a top view of the film shown in FIG. 6E, showing the folds and sections for single roll folding (sections IL and HL) and multiple roll folding (sections HR to LR).

With reference to FIG. 7, the film in FIGS. 5 to 6E is shown partially packaged, before the last folding steps prior to packing. Section T7 (FIG. 5) of the film 50 corresponding to the outer tip portion of the wing (i.e. comprising the aileron) is denoted by 101 in FIG. 7, while the right-hand sections of the film contain an "R" and the left-hand contain an "L". The left-hand sections are identified by IL and HL, and the right-hand sections are identified by HR, IR, JR, KR, and LR. The central section CE is placed between the left-hand and right-hand sections. The left-hand and right-hand sections are thus accordion folded using the folds of the left-hand section 5L and 5H, and the folds of the right-hand section 5R to 9R, and it will be appreciated that the number of folding sections, and therefore the number of folds, varies according to different embodiments.

Figure 8A:
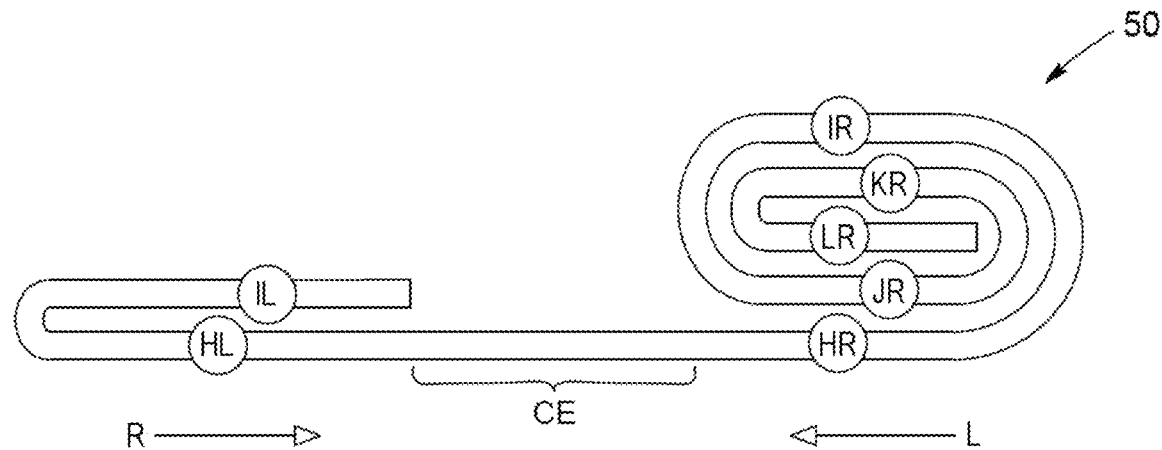
FIG. 8A is a side view of the film shown in FIG. 7 having a rolled portion.
Figure 8B:
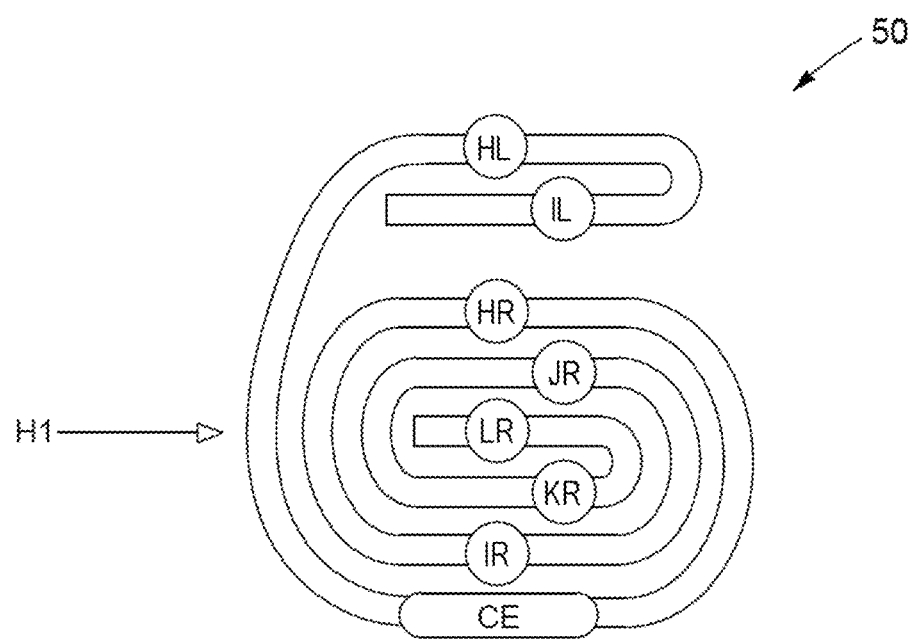
FIG. 8B is a side view of the film shown in FIG. 8A, the roll folding being followed by gate folding.

With reference to FIGS. 8A and 8B, an alternative embodiment is shown of the film 50 intended for masking an aircraft wing packaged as shown in FIG. 7 and the right-hand and left-hand sections then packaged by multiple roll folding, i.e. IL onto HL in direction R and LR onto KR, then onto JR, then onto IR, and finally onto HR in direction L (FIG. 8A). The left-hand and right-hand sections are then folded onto the central section CE by single roll folding along fold H1 to form a stacked film (FIG. 8B). As a last step for the packaging of this film, the end section of the sleeve of the film is folded onto the stack in FIG. 8B in order to form a packaged film ready to be bagged for sending to the aircraft finishing center, for example.

In the embodiment shown in FIGS. 6D and 6E, a guide element 70 is inserted inside the film 50 to the end of the film corresponding to the sleeve 101 in FIG. 7, this guide element 70 substantially corresponding to the dimensions of the aileron and substantially fitting the shape of section T7 of the film 50. As described below, the guide element is used to position the film on the aircraft component to be masked and guide the person unfolding the film on the component in the unfolding steps.

Figure 9B:
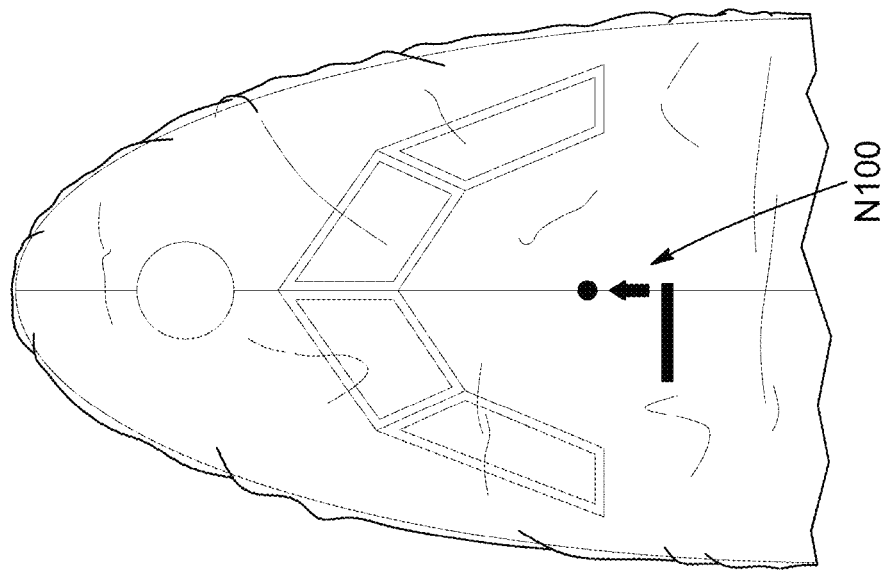
FIGS. 9A and 9B are perspective views of a film for masking an aircraft nose cone according to one embodiment, the film being positioned on the nose and comprising positioning marks.
Figure 9A:
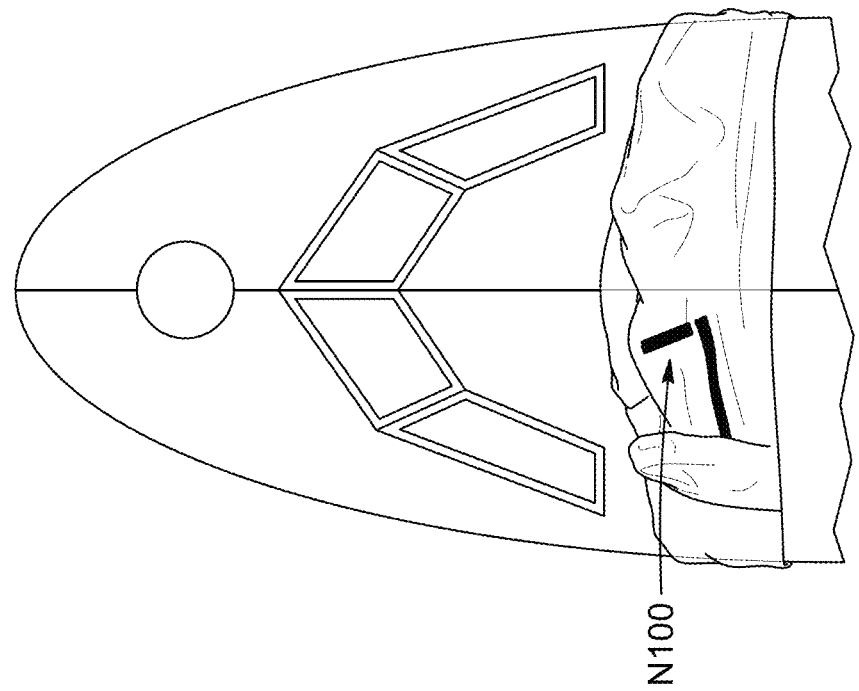

When the film is unfolded on an aircraft component, the reverse steps of the packaging steps are carried out once the film has been removed from its bag and the stacked film has been placed on the component. The stacked film is positioned in the appropriate place, i.e. in the case of the aircraft nose cone on the upper part of the nose, on the component to be masked using the positioning marks N100, examples of which are shown in FIGS. 9A and 9B. In FIGS. 9A and 9B, the marks comprise the word "nose" and an arrow indicating the orientation of the aircraft nose. The marks enable the positioning of the film relative to geometric features of the aircraft component. It will be appreciated that the marks can comprise one or more arrows, the name of a part of the aircraft component such as "nose", or an orientation, "left", "right", "top", etc. It will also be appreciated that a kit comprising a film and a guide element can be used, the guide element guiding the first steps of the sequence for unfolding the film on the component.

For a film for masking a wing as shown in FIG. 5, the unfolding is thus carried out by first of all placing the film 50 at the wing tip. The end of the sleeve 101 folded on top of the stack is unfolded first and slid onto the outer tip of the aileron, without the rest of the stack necessarily being unfolded. The gate or roll folds of the stack are then unfolded on each side of the wing, i.e. under the effect of gravity, the two sub-fold sections can hang down on each side of the wing. The film is therefore unfolded in the transverse direction $T_w$ (FIG. 1B) of the wing.

Following the positioning of the film 50 on the wing tip, the film is unfolded by pulling on it in the longitudinal direction $L_w$ (FIG. 1B) of the wing toward the fuselage, opening out the telescopic folds. The film is therefore unfolded both above and below the wing like a glove enveloping a hand. The first element enveloped by the film is the end of the wing comprising the aileron. It will be appreciated that this type of film and unfolding method can also apply to aircraft components other than a wing, for example the stabilizers or the vertical stabilizer.

As mentioned above, a guide element 70 is inserted into the sleeve 101 during the packaging of the film in order to assist in the positioning of the film on the wing. On unfolding, the guide element 70 makes it possible to locate in the stack the fold by which the packaged film should be slipped onto the tip of the aileron for subsequent unfolding on the wing. This guide element can also indicate the first opening step to be carried out during unfolding. For example, for a step of unfolding two sections of the film, the guide element will be slipped into a central portion, e.g. portion CE in FIG. 7, of a film that is to be unfolded on each side of an aircraft component. The guide element is preferably rigid and of a contrasting color to the film. It will be appreciated that the guide element can be made from cardboard. It will also be appreciated that the guide element can be flexible.

In the embodiment shown in FIGS. 6D and 6E, a kit 60 comprising a film 50 for masking an aircraft component and a guide element 70 packaged with the film 50 for the subsequent unfolding of the film 50 on the component is supplied.

Another embodiment of a film for masking an aircraft component consists of packaging it by winding around a core. This type of packaging consists of winding the film around a circular core by its transverse or longitudinal part.

Alternatively, another embodiment of a film is packaging by winding the film on itself, without a core. A person skilled in the art will understand that the type of folding and/or winding can be selected depending on the shapes and dimensions (length, width, one layer, or tubular (two layers)) of the film pattern in question.

As described above, the packaging of the masking films is carried out in a combination of several types of folding or winding depending on the pattern of the film in accordance with the shapes and dimensions of the aircraft component to be enveloped. A person skilled in the art will understand that these are mainly large scale parts and that the problem is therefore not only the packaging of the film for the secure, optimum packing and transportation thereof, but also the methodical unfolding of the film on the aircraft as such, in order to optimize the time taken to mask the component and remove the film from the component without causing damage (e.g. scratches) to the aircraft component.

In one embodiment for enveloping and protecting a large scale aircraft wing, the film is packaged by an accordion and/or gate and/or roll folding operation on its transverse portion. The film is then wound around a core on its longitudinal portion. It will be appreciated that, in an alternative embodiment, the film is packaged by winding the longitudinal portion on itself, without a core. It will also be appreciated that these packaging modes can be adapted to mask a small scale aircraft component.

In one embodiment for enveloping and protecting a large scale aircraft wing, the film is packaged by a telescopic folding operation on a longitudinal portion of the film. The film is then packaged by a roll folding and/or accordion folding and/or gate folding operation on its transverse portion.

In one embodiment for packing and protecting a horizontal stabilizer or a vertical stabilizer of an aircraft, the film is packaged by a telescopic folding operation on its longitudinal portion. The film is then packaged by a roll or accordion folding operation or wound on itself or wound around a core on its transverse portion.

Figure 10B:
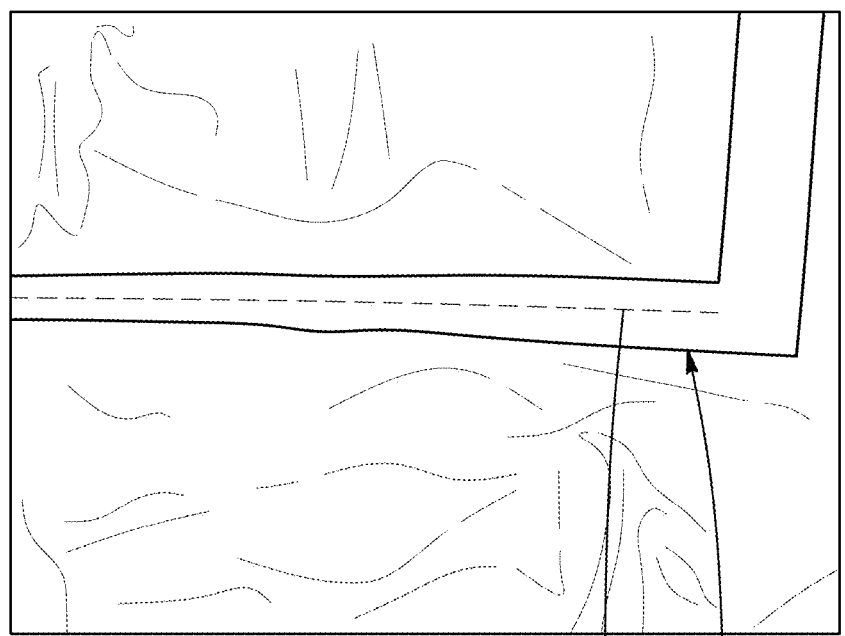
FIGS. 10A and 10B are perspective views of a film according to one embodiment, the film comprising positioning marks that include contrasting perforated tapes forming a tear line.
Figure 10A:

In another embodiment of the film for masking an aircraft component, the positioning marks include one or more tapes on one or both faces of the film. As shown in FIGS. 10A and 10B, these tapes P100 can comprise perforated dots P102 forming a tear line. The person who unfolds out the film on the aircraft component can thus tear the film along the tear lines to form detachable segments of film, thus making it possible to cover and/or go around certain elements of an aircraft as described below. Certain segments can also be completely detached from the film for scrapping on unfolding near certain aircraft components. It will be appreciated that the tapes can be colored, opaque, translucent, or printed.

As shown in FIG. 10A, the film will be torn to separate a part of the film on unfolding in order to go around or let through aircraft components such as antennas, stabilizer bases, tripod supports or other equipment. The tear lines also make it possible to make an opening of predetermined dimensions and position, e.g. for a door, in the film without using a cutting tool, according to the aircraft components and the geometric features thereof. As shown in FIG. 10B, the film portions are pulled in opposite directions on either side of the sides of the perforated tapes in order to cause controlled tearing of the film. The torn rectangular portion, located inside the tapes, will thus be removed, pushed or raised in order to gain access to a door of the aircraft when the film is unfolded on the aircraft component.

As described above and as is obvious to a person skilled in the art, it will be appreciated that the films can be packaged in several folding steps or in a single folding step. The combinations of steps can comprise telescopic folding, accordion folding and gate folding. Another combination can comprise telescopic folding, roll folding and gate folding. Another combination can comprise gate folding and winding around a core. Another combination can comprise accordion folding in a first direction, accordion folding in a second direction and gate folding. Another combination can comprise accordion folding and winding around a core.

In addition, although the embodiments of the film and kit consist in certain geometric configurations, as explained and described above, only a portion of these components and geometries is essential and thus the majority thereof must not be interpreted restrictively. As is obvious to a person skilled in the art, other components and engagement between them, as well as other geometric configurations, can be used for the film and the kit, as briefly explained above and as can be inferred by a person skilled in the art. In addition, it will be appreciated that the positions of the description, such as "above", "below", "left-hand" and "right-hand", and other similar positions, must be interpreted in the context of the figures, unless otherwise specified, and must not be considered to be lmitative.

Several alternative embodiments and examples have been described and shown above. The embodiments of the invention described above are only examples. A person skilled in the art will appreciate the features of the individual embodiments, together with the possible combinations and variants of the components. A person skilled in the art will also appreciate that any of the embodiments can be produced in any combination with the other embodiments described above. It will be appreciated that the invention can be produced in other specific forms without departing from the spirit or main features thereof. The examples and embodiments described must be considered in all aspects to be illustrative and non-restrictive, and the invention is not limited to the details given. Thus, although specific embodiments have been shown and described, numerous modifications are obvious without departing from the spirit of the invention. The scope of the invention is thus solely limited by the scope of the claims.

The invention claimed is:

1. A packaged film for masking an aircraft component, the packaged film being configured to form a tubular sleeve when unpackaged, wherein the packaged film is formed by:
performing a longitudinal telescopic folding operation on a longitudinal portion of a film to provide a longitudinally parallelogram-shaped stacked film; and
performing at least a first transverse folding operation on a first portion of the longitudinally parallelogram-shaped stacked film, the first transverse folding operation comprising an operation selected from accordion folding and roll folding to provide the packaged film;
the packaged film being capable of being unfolded in a reverse order of the longitudinal telescopic folding operation and the first transverse folding operation to cover said aircraft component.

2. The packaged film of claim 1, wherein the packaged film is for masking an aircraft wing.

3. The packaged film of claim 1, wherein the packaged film has an inner face and an outer face, the packaged film comprising positioning marks on at least one face of the inner face and the outer face of the packaged film, said positioning marks being positioned on said at least one face according to geometric features of said aircraft component to guide a positioning of the packaged film when unpackaged.

4. The packaged film of claim 3, said positioning marks including a tape selected from the following: a colored tape, a printed tape, a translucent tape, wherein the tape comprises perforated dots forming a tear line suitable for forming detachable segments of film.

5. The packaged film of claim 1, wherein the first transverse folding operation on said first portion of the longitudinally parallelogram-shaped stacked film is in a direction parallel to a base of the longitudinally parallelogram-shaped stacked film to form a first stacked section.

6. The packaged film of claim 5, said base extending perpendicular to said longitudinal portion of the film.

7. The packaged film of claim 5, the packaged film being further formed by performing a second transverse folding operation on a second portion of the longitudinally parallelogram-shaped stacked film, the second transverse folding operation comprising an operation selected from accordion folding and roll folding operation in a parallel direction in order to form a second stacked section.

8. The packaged film of claim 7, the packaged film being further formed by performing a third folding operation of the first and second stacked sections in said parallel direction to provide the packaged film.

9. The packaged film of claim 8, wherein the third folding operation comprises a gate folding operation.

10. The packaged film of claim 1, said sleeve having an open end and a closed end longitudinally opposite the open end.

11. The packaged film of claim 10, the packaged film being formed by a single folding operation of said closed end in a direction perpendicular to a base of the longitudinally parallelogram-shaped stacked film.

12. The packaged film of claim 1, wherein the packaged film is for masking an aircraft wing, wherein said sleeve forms a conical tube and comprises three sealed ends, thus covering, when unfolded on the aircraft wing, a side of the aircraft wing running along a leading edge, a side of the aircraft wing running along an aileron, and a side running along the wing tip.

* * * * *